United States Patent [19]
Smith et al.

[11] 3,782,082
[45] Jan. 1, 1974

[54] CEILING FILTER SYSTEM FOR CLEAN ROOM

[75] Inventors: Thomas R. Smith; Robert W. Pond; Richard D. Rivers, all of Louisville, Ky.

[73] Assignee: American Air Filter Company, Inc., Louisville, Ky.

[22] Filed: Nov. 8, 1971

[21] Appl. No.: 196,555

[52] U.S. Cl.................. 55/494, 55/484, 55/500, 55/502, 55/504, 55/507, 98/40 D
[51] Int. Cl................................................ B01d 31/00
[58] Field of Search............ 98/40 D; 55/DIG. 29, 55/482–489, 490, 493, 494, 504, 497–500, 501, 502, 507, 509, 511, 521

[56] References Cited
UNITED STATES PATENTS

| | | | |
|---|---|---|---|
| 3,069,991 | 12/1962 | Ericson | 98/40 D |
| 3,127,258 | 3/1964 | Revell | 55/499 |
| 3,250,063 | 5/1966 | Andrews | 55/483 |
| 3,360,910 | 1/1968 | Soltis | 55/483 |
| 3,418,915 | 12/1968 | Marble | 55/DIG. 29 |
| 3,707,046 | 12/1972 | De Baun | 55/483 |

FOREIGN PATENTS OR APPLICATIONS 727,975  4/1955  Great Britain ...................... 55/487

Primary Examiner—Bernard Nozick
Attorney—Ralph B. Brick et al.

[57] ABSTRACT

An air filtering ceiling system having a plurality of flow-through filtering ceiling panels, each panel being adapted for fluid tight communication with adjacent ceiling panels wherein all of the air entering a plenum enters through the panels, the individual panels being further adapted to be snapped in and out of a ceiling panel support structure.

7 Claims, 8 Drawing Figures

PATENTED JAN 1 1974

CEILING FILTER SYSTEM FOR CLEAN ROOM

BACKGROUND OF THE INVENTION

This invention relates to an air filtering ceiling. More particularly, the invention relates to a new air filtering system for use in commercial and industrial buildings and specifically in a clean room wherein air filtering ceiling panels snap in and out of a ceiling panel support structure.

In recent years there has been considerable activity in the providing of rooms having a predetermined controlled environment. These rooms have been specifically adapted for manufacturing and packaging of modern electronic equipment, manufacturing and packaging of drugs and medicine, hospital operating rooms, nurseries and intensive care areas, food processing plants, and other uses wherein it is desirable to maintain an environment which is nearly absolutely dust free. In the preparation of these rooms, one method of providing an environment which is nearly absolutely dust free has been the installation of flow-through ceilings having flow-through filters above the ceiling to remove the dust particles from the air prior to the entering of the room which is to be environmentally controlled.

One innovation in clean room designs or areas designated as clean areas has been the installation of an entire ceiling or a large portion thereof made of absolute filters wherein large volumes of filtered air are distributed vertically from the ceiling to the room at low to medium velocity. Most of these installations have proven to be expensive in the initial installation. Furthermore, as the filters become dirty, removal of the dirty filters and replacing has become a major problem. Many of these units have filters which are positioned above the flow-through ceiling and in order to remove the filters an entrance has to be provided either above the flow-through ceiling or else a part of the ceiling must be removed and access doors installed in order to gain access to the filters and change the dirty filters for clean ones.

SUMMARY OF THE INVENTION

In the present invention it is recognized that it is desirable to provide an air filtering ceiling having a plurality of air filtering ceiling panels that are easily removed and replaced. It is further recognized that it is desirable to provide an air filtering ceiling having fluid tight communication between adjacent ceiling panels whereby all of the air entering an environmentally controlled area must pass through a filter. Also, it is recognized that it is desirable to provide an air filtering ceiling that eliminates the requirement for diffusers, registers, and the like; that is adaptable for use in existing architectural standards for suspended accoustical or standard ceiling; and is economical to install and maintain.

The present invention advantageously provides a straight-forward arrangement for the preparation of an air filtering ceiling. The present invention further advantageously provides an air filtering ceiling composed of a plurality of air filtering ceiling panels which are adapted to snap in and out of a ceiling panel support structure. The present invention also provides for the uniform distribution of air over the entire ceiling.

Various other features of the present invention will become obvious to those skilled in the art upon reading the disclosure set forth hereinafter.

More particularly, the present invention provides an air filtering ceiling comprising a flow-through ceiling support means extending downwardly having snap receiving means adapted for receiving a flow-through filter assembly in fluid tight communication therewith; the filter assembly including filter media and a pan assembly; the pan assembly having a pervious bottom and impervious sides with snap means adaptable for communication with the snap receiving means of the support means; and the filter media being adapted for fluid tight communication with the inner periphery of the sides of the pan assembly whereby generally all the air passing through an air filtering ceiling into a room passes through the filter media.

It is to be understood that the description of the examples of the present invention given hereinafter are not by way of limitation. Various modifications within the scope of the present invention will occur to those skilled in the art upon reading the disclosure set forth hereinafter.

Referring to the drawings.

Figure 1:
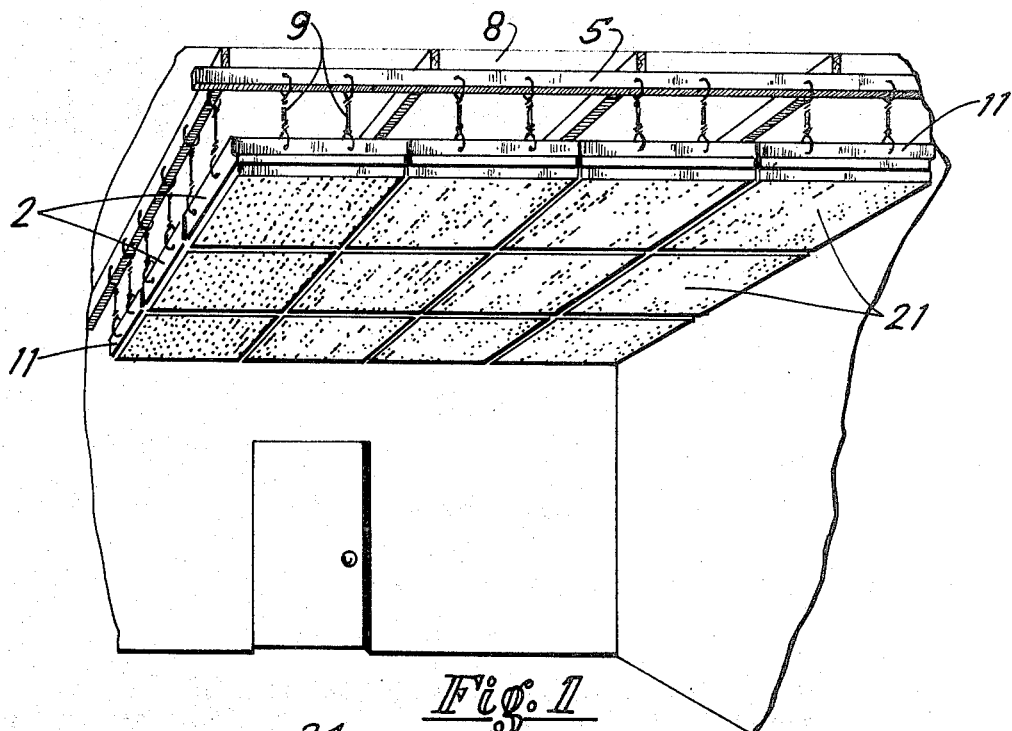
FIG. 1 is a perspective view of a flow-through ceiling of the present invention including a plurality of filter assemblies.

FIG. 1 illustrates one air filter ceiling system of the present invention comprising a plurality of rectangularly shaped flow-through support frames 2 suspended from the rafters 5 of a roof 8 by a plurality of wires 9. The plurality of support frames 2 are held in side by side abutting relationship by fastening means, such as rivets 6. The support frames 2 include aligned apertures 4 (FIG. 4) therein for receiving rivets 6 therethrough. Each rectangular shaped support frame 2 has at least one aperture 4 in each downwardly extending vertical side 11 wherein each of the apertures 4 is adapted for aligning with its counterpart in the opposed downwardly extending side 11 of an adjacent support frame 2.

Support frame 2 further includes apertures 3 therein for receiving wires 9 therethrough. In each downwardly extending side 11 is at least one aperture 3 therein.

The support frames 2 of this invention can be formed of any one of several suitable materials in any one of several suitable manners, the embodiments of the support frames illustrated in the figures being formed from sheet metal. The specific configuration of the support frame 2 will depend on the application, but the frame 2 is preselected for receiving a particular configured filter pan assembly 7 therein.

Figure 2:
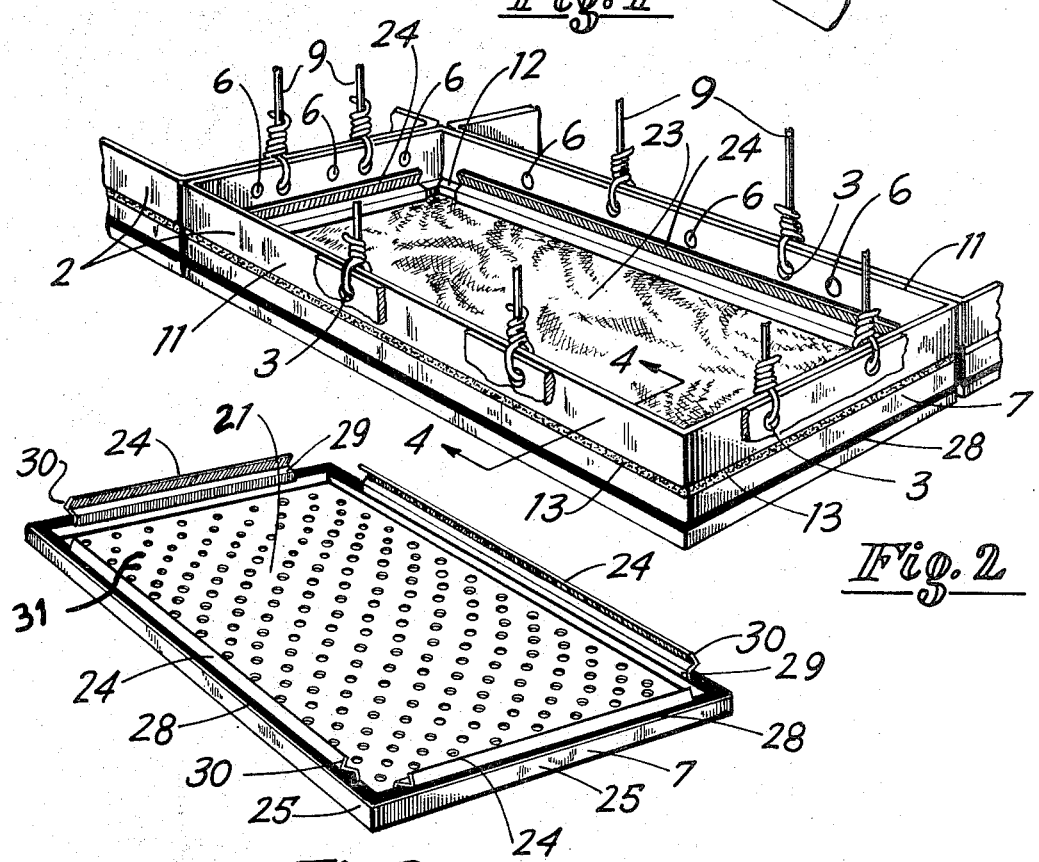
FIG. 2 is an enlarged perspective view of one preferred filter assembly of FIG. 1 including support means.
Figure 3:
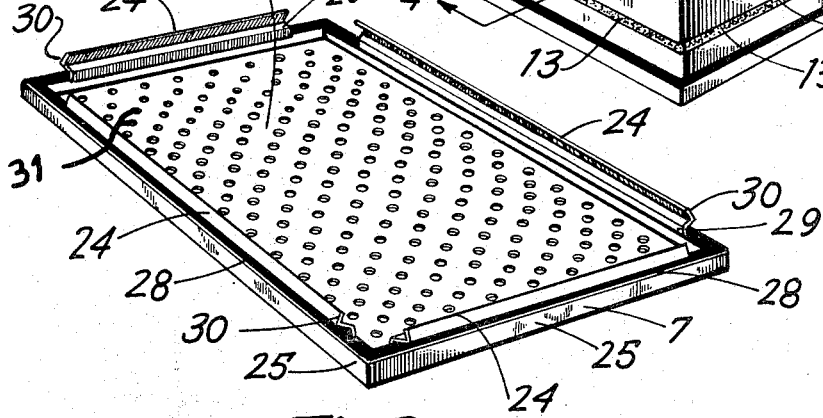
FIG. 3 is a perspective view of a filter pan assembly of FIG. 2.
Figure 4:
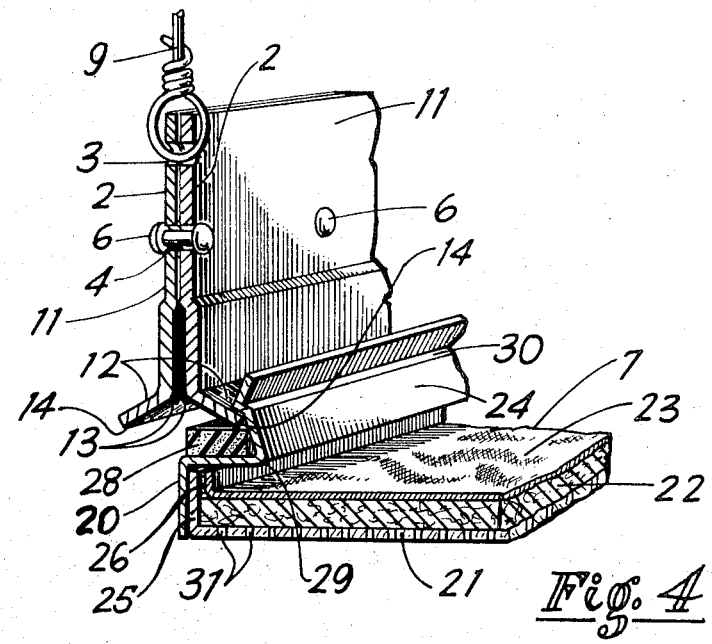
FIG. 4 is a cutaway, in perspective, along line 4—4 of the perspective view of FIG. 2 illustrating one preferred filter panel for the present invention.

FIGS. 2, 3 and 4 illustrate one pan assembly 7 of the present invention including a flat high efficiency particulate air (HEPA) filter 23 therein which meets requirements of Federal Standard 209A, Class 100 for a sterile environment, the pan assembly 7 being adaptable for receipt by the support frame 2. However, other filters having less filtering efficiency may be used depending upon the level of cleanliness desired. The downwardly extending vertical sides 11 of frame 2 are generally of Z-shaped or offset cross section having an inwardly extending lip 12 at its lower extremity. Lip 12 is adapted to receive a flexible snap means or spring latch 24 of the filter pan assembly 7, the spring latch 24 being of generally S-shaped cross-sectional configuration. Lip 12 extends generally around the entire lower extremity of the support frame 2 whereas spring latch 24 extends generally a sufficient distance around the upper extremity of the pan assembly 7 so that in mating with support frame 2 the communication will be fluid tight, as discussed hereinafter. The angle of downward slope of lip 12 in relation to a horizontal plane is generally less than 45°, but generally greater than 15°. An angle of slope greater than 45° would allow for slippage of the filter pan assembly 7 due to the weight of the pan assembly 7 whereas an angle of slope less than 15° increases the difficulty of adapting spring latch 24 for an easily installable and easily removable filter pan assembly 7. Furthermore, lip 12 has a sharp lower edge 14 for engaging with a soft, pliable gasket 28 on filter pan assembly 7 in fluid tight relationship. The gasket 28 may be, for example, a spongy elastomeric material, a liquid sealant of high viscosity and the like. The shapr edge 14 imbeds itself into the soft, pliable gasket 28 thereby preventing leakage of non-filtered air around the connection of the lip 12 and the spring latch 24.

The downwardly extending adjacent sides 11, each of which is of generally Z-shaped cross-section having upper and lower vertical offset portions with an angular portion disposed therebetween, are each provided along their lower vertical portion with soft or fluid sealant strips 13 attached thereto to extend around the exterior of the frame 2, the sealant strips 13 being of sufficient thickness so that adjacent sealant strips abut each other in fluid tight relationship.

The spring latch 24 of generally S-shaped configuration includes a turned upper end portion 30 which resiliently nests in overlap relationship with downwardly sloping lip 12 of side 11 and an intermediate angle portion 29, which serves to receive the soft sealant 28 therein, sealant 28 being adapted for receiving the lower edge 14 of lip 12 and extending generally around the periphery of the pan assembly 7.

The filter pan assembly 7, as illustrated in FIGS. 2, 3 and 4, also includes a perforated or pervious bottom 21 having a plurality of flow-through perforations 31 therein for the passage of filtered air therethrough. Perforations 31 generally represent greater than 2.8 percent of the surface area of the bottom 21 but generally less than 30 percent. Spaced above the perforated bottom 21 is a flat HEPA filter 23 with a diffuser or spacer 22 disposd therebetween. The HEPA filter 23 illustrated is a high efficiency media having several million minute cells per square inch. Spacer 22 is of a preselected thickness so that air can be drawn at essentially uniform velocity through the HEPA filter 23 before it converges at each of the perforations 31 of the perforated bottom 21. Absence of a diffuser or spacer would result in localized filtration at each perforation 31.

Spacers 22 are illustrated as coarse, fibrous material containing generally about ten cells per square inch. However, other materials and means for spacing and diffusing the air for uniform distribution over the perforated bottom 21 may also be used without departing from the scope and spirit of the present invention.

Filter pan assembly 7 further includes upwardly extending sides 25 which are attached to the perforated bottom 21 in fluid tight communication by any known method, such as welding, riveting and the like, or the sides 25 and the perforated bottom 21 may be of integral, unitary construction. Sides 25 are attached by some suitable means, such as welding, to the downwardly extending vertical lower end portion 20 of spring latch 24. Disposed between the upwardly extending sides 25 and the high efficiency filter 23 and extending around the entire inner periphery of pan 7 in a unitary strip is a fluid tight sealant 26 which may be any soft, resilient, impervious sealant.

Figure 5:
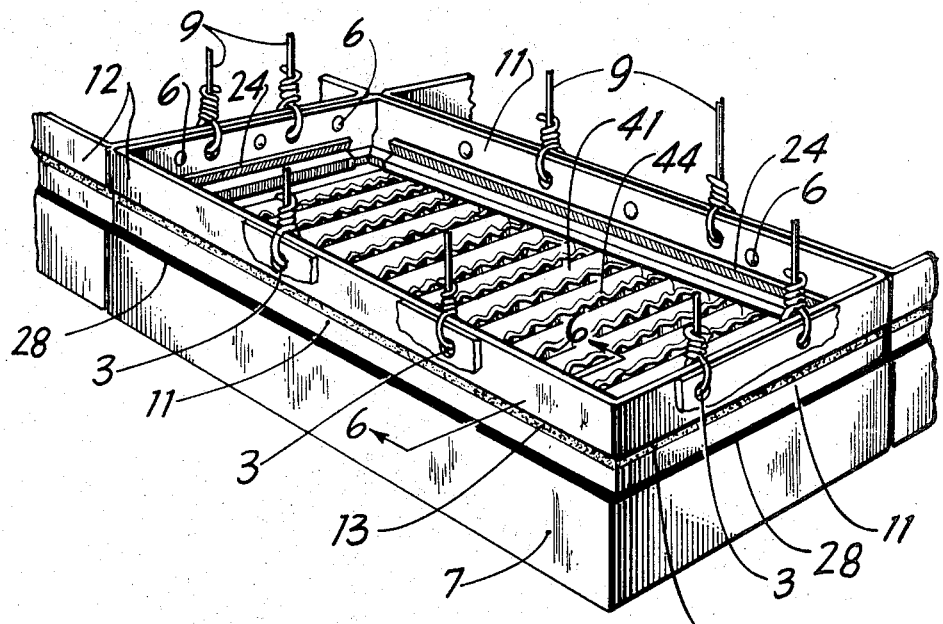
FIG. 5 is an enlarged perspective view of another preferred assembly of FIG. 1 including support means.
Figure 6:
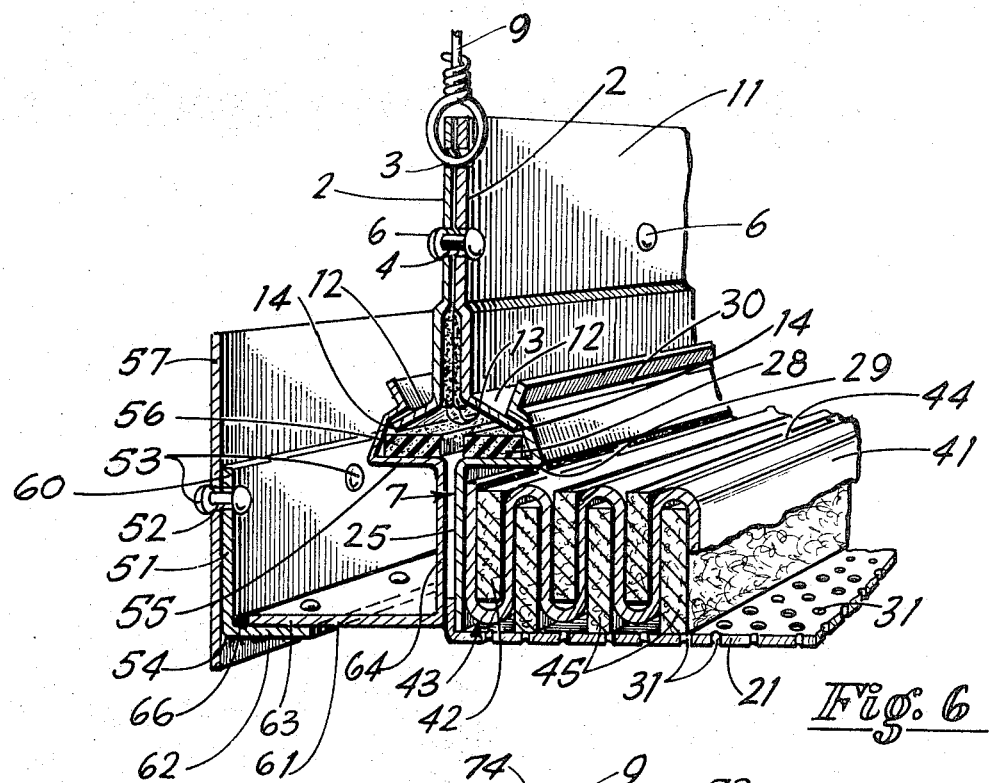
FIG. 6 is a cutaway, in perspective, along line 6—6 of the perspective view of FIG. 5.

FIGS. 5 and 6 illustrate another advantageous embodiment of the present invention utilizing an extended pleated surface HEPA type filter 41 including upper spacers 44 and lower spacers 45. Extended surface filter 41 is utilized in areas requiring an increased air flow over the filter media 23 discussed previously. The spacers 44 and 45 are utilized to maintain the filter 41 in its extended configuration. The spacers 44 and 45 may be of coarse fiber, such as that illustrated by the spacers 22 above, or they may be of a corrugated configuration, such as a heavy paper, aluminum, plastic or any other configuration which will not affect or interfere with the air filtering process. Disposed between the downwardly extending side 25 and the extended filter 41 is a fluid tight sealant 43. It is realized that if the extended surface type filter is preformed with sufficient rigidity, spacers may not be needed.

Figure 7:
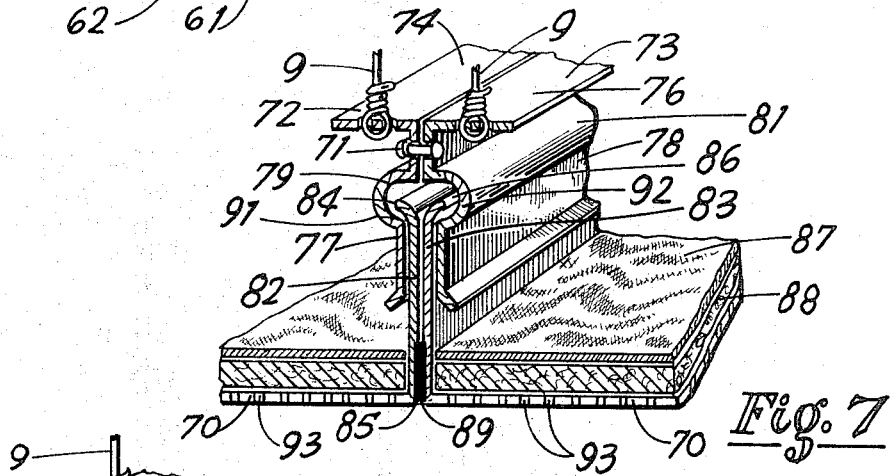
FIG. 7 is a cutaway, in perspective, of still another preferred assembly of a flow-through ceiling of the present invention; and, FIG. 8 is a cutaway, in perspective, of another preferred support means for use with the filter pan assembly illustrated in FIG. 7.

FIG. 7 illustrates still another advantageous embodiment of the present invention comprising a plurality of opposed, in mirror image relation, L-shaped support members 72 and 73 forming a support of generally T-shaped cross-section suspended from the rafters 5 of the roof 8, as shown in FIG. 1, by a plurality of wires 9. The opposed L-shaped members 72 and 73 include horizontal extending portions 74 and 76 respectively, and downwardly extending portions 77 and 78, respectively. The plurality of opposed L-shaped support members 72 and 73 are held in side by side abutting relationship at their downwardly extending portions 77 and 78 by fastening means, such as rivets 71. Each of the downwardly extending portions 77 and 78 includes an inwardly extending groove, the downwardly extending portion 77 including inwardly extending groove 79 and the opposing downwardly extending portion 78 including inwardly extending groove 81. The grooves 79 and 81 are adapted for alignment forming a generally inverted U-shaped cross-section with inwardly extending portions 91 and 92, respectively, for receiving turned upper end portions 84 and 86 of upwardly extending sides 82 and 83 of a filter pan assembly 70. The upwardly extending sides 82 and 83 including the turned upper end portions 84 and 86, respectively, nest in overlapping relationship with the inwardly extending portions 91 and 92, respectively, of the inwardly extending grooves 79 and 81. At the lower extremity of the upwardly extending sides 82 and 83 are soft, pliable sealants 85 and 89, respectively, for fluid tight communication between sides 82 and 83. The filter pan assembly 70 having a plurality of apertures 93 therein further includes a flat high efficiency particulate air filter 87 therein with a diffuser 88 being disposed between the pan 70 and the filter 87.

The L-shaped members 72 and 73 are made from any resilient material, such as cold roll steel, of sufficient thinness so that the downwardly extending portions 77 and 78 can be forced away from each other with a minimum amount of effort for inserting the upwardly extending sides 82 and 83 therein whereby the support member will return to its generally original position maintaining fluid tight communication between the upwardly extending sides 82 and 83.

Figure 8:
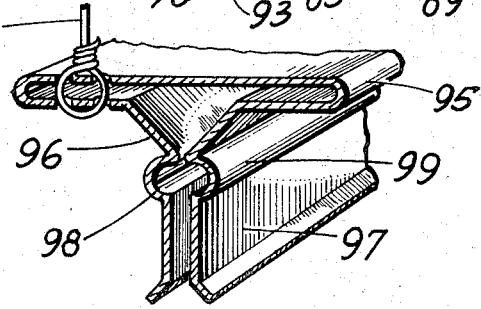

FIG. 8 illustrates still another novel support means which may be used with the filter pan assembly 70 as described hereinbefore and illustrated in FIG. 7. A support member 95 of unitary construction is provided and is generally of T-shaped cross-section with a pair of downwardly extending portions 96 and 97. The portions 96 and 97 include opposed inwardly extending grooves 98 and 99, respectively, for receiving the turned upper end portions 84 and 86 of the upwardly extending sides 82 and 83 of the filter pan assembly 70 illustrated in FIG. 7.

In the installation of an air filtering system of the present invention, since there will be in all probability areas that are not covered by standard designed pan assemblies, it will be necessary to provide for blank offs or adjustable sealed ledger sills at the edges of the walls and the corners of the room where the flow-through ceilings are to be installed. In one preferred method of blanking off the edges, as illustrated in FIG. 6, an edge blank off 51 including two members of substantially L-shaped cross-section 60 and 61 in opposed relationship with overlapping coextensive legs 62 and 63 adaptable for adjusting to the contour of the spacing between the wall 57 and support means 2 is provided. A spring latch 55 of S-shaped configuration similar to spring latch 24 is provided at the upper extremity of leg 64 of member 61 to receive a soft gasket material 56, such as a sponge rubber, thereon for communicating with the lip 12 of the support frame 2. L-shaped member 60 of edge blank off 51 is provided with apertures 52 therein for receiving fastening means, such as rivets 53, therethrough for attaching the blank off 51 to wall 57. An impervious soft sealant 54 is provided to fill the space between the L-shaped member 60 and the wall 57 for providing a fluid tight seal between the blank off 51 and the wall 57. Also, a fluid tight sealant 66 is provided at the overlap juncture of coextensive legs 62 and 63.

In the installation of the filter pan assembly 7 into the filter support frame 2, simply lining up the spring latch 24 with the inwardly extending lip 12 and pressing upwards until the spring latch 24 passes over and is received by the lip 12 is all that is necessary. For removing the filter pan assembly 7 from the ceiling when the filter has become dirty, it is only necessary to simply apply pressure on the filter pan assembly in a downward direction and the spring latch 24 will be forced inward and downward until it is released by the lip 12.

In installation of the filter pan assembly 70 as illustrated in FIG. 7, snapping the filter pan assemblies in and out of the support members 72 and 73 is accomplished by simply lining up the upwardly extending sides 82 and 83 of the pan assemblies 70 and 75 and pressing upward until the turned upper end portions 84 and 86 nest in overlapping relationship with the inwardly extending portions 91 and 92. Removal of the pan assembly 70 from the L-shaped support members 72 and 73 is accomplished by simply applying pressure on the pan assembly 70 in a downwardly direction and the turned upper end portions 84 and 86 will force the downwardly extending sides 77 and 78 of the L-shaped members 72 and 73 outwardly thereby releasing the turned upper end portions 84 and 86 from their nesting position.

In most instances the support means is suspended from the rafters of a roof, as shown in FIG. 1, with a suitable air supply means (not shown) being connected to the plenum formed therebetween. In large buildings and the like, one room may contain a flow-through ceiling whereas adjacent rooms may not. In this case, it is necessary to attach the support means to a means supplying air to the ceiling, such as an air duct. Further, it is necessary to supply air to the flow-through ceiling whether through a plenum defined by a roof and the flow-through ceiling or an air duct at a pressure slightly above atmospheric to maintain a constant flow of air down through the flow-through ceiling and into the environmentally controlled room. Since the means for supplying air, such as a blower, and lines for transporting the air are conventional, they are not illustrated.

We claim:

1. An air filtering ceiling comprising:
   a. a flow-through ceiling support means extending downwardly, said support means including a frame of generally rectangular shape with downwardly extending sides of generally Z-shaped cross-section and each side further includes an inwardly extending lip at the lower end thereof defining snap receiving means for receiving a flow-through filter assembly in fluid tight communication therewith;
   b. a flow-through filter assembly, said filter assembly including filter media and a pan assembly, said pan assembly having a pervious bottom and impervious sides including snap means for removably engaging with said snap receiving means of said support means, said snap means being a spring latch having an outwardly turned upper end portion which nests in overlap relationship with said inwardly extending lip; and
   c. the edges of said filter media being in fluid tight engagement with the sides of said pan assembly whereby generally all the air passing through an air filtering ceiling into a room passes through said filter media.

2. The air filtering ceiling of claim 1 wherein said lip has a sharp edge at its extremity, said upwardly extending sides of said pan assembly having an intermediate angle portion with a sealant disposed within said angle portion adaptable to receive said sharp edge of said lip in fluid tight relationship.

3. The air filtering ceiling of claim 1, said support means being adapted for fluid tight communication with adjacent support means.

4. The air filtering ceiling of claim 1, said media being of the type that meets requirements of Federal Standard No. 209A, Class 100 for a sterile environment whereby the air filtering ceiling is adaptable for clean rooms.

5. The air filtering ceiling of claim 1 wherein said filter media is of the extended pleated type.

6. The air filtering ceiling of claim 1 wherein said filter media is flat and spaced from said porous bottom by spacer means and is adaptable for fluid tight communication with said impervious sides of said pan assembly.

7. The air filtering ceiling of claim 1 including an edge blank off adapted for spacing between a wall and said sides of said pan assemblies.

* * * * *